United States Patent
Kaschke

[11] Patent Number: 6,044,153
[45] Date of Patent: Mar. 28, 2000

[54] HAND ADAPTIVE TELEPHONE

[75] Inventor: Kevin D. Kaschke, Hoffman Estates, Ill.

[73] Assignee: Motorola, Inc., Schaumburg, Ill.

[21] Appl. No.: 09/016,878

[22] Filed: Jan. 30, 1998

[51] Int. Cl.$^7$ ..................................................... H04M 1/00
[52] U.S. Cl. ........................... 379/433; 379/446; 379/455
[58] Field of Search ..................... 379/433, 447, 379/446, 455; 2/160, 159; 968/405, 883, 895; 455/90

[56] References Cited

U.S. PATENT DOCUMENTS

| | | |
|---|---|---|
| 2,470,687 | 5/1949 | Cafrella et al. . |
| 4,589,134 | 5/1986 | Waldron . |
| 4,727,599 | 2/1988 | Rappaport et al. . |
| 4,833,726 | 5/1989 | Shinoda et al. . |
| 4,847,818 | 7/1989 | Olsen . |
| 4,864,658 | 9/1989 | Russell et al. ............................... 2/160 |
| 4,876,724 | 10/1989 | Suzuki . |
| 4,882,769 | 11/1989 | Gallimore . |
| 5,014,040 | 5/1991 | Weaver et al. . |
| 5,133,233 | 7/1992 | Erwin . |
| 5,182,814 | 2/1993 | Christensen . |
| 5,210,880 | 5/1993 | Yale . |
| 5,235,560 | 8/1993 | Seager . |
| 5,235,561 | 8/1993 | Seager . |
| 5,239,521 | 8/1993 | Blonder . |
| 5,486,112 | 1/1996 | Troudet et al. .......................... 434/250 |

OTHER PUBLICATIONS

Advertising brochure for accessories for Sport Radios by Motorola, 1995, 2 pages.

Advertising brochure for Sport Two–way radios by Motorola, 1996, 6 pages.

"Fashion fits firms: Goods, services going soft, softer, softest," *Chicago Tribune*, Sunday, Oct. 18, 1992, Section 7, p. 3.

"New Product," *Cellular Business*, Oct. 1992, p. 74.

"Two Firms Develop Wearable Systems Using Radio Links," *Mobile Data Report*, Jan. 28, 1991, pp. 2–4.

*Primary Examiner*—Jack Chiang
*Attorney, Agent, or Firm*—Kevin D. Kaschke; Sylvia Chen

[57] ABSTRACT

A hand adaptive telephone (10) comprises a glove member (12) adapted to be worn on a person's hand (14) and carries a user interface mechanism including an earpiece transducer (18) and a microphone transducer (20). The earpiece transducer (18) is adapted to be coupled to a receiver (30) and is carried by the glove member (12) at a location on an inside (22) of the person's hand (14) when the glove member (12) is worn on person's hand (14) to permit the person's ear (26) to listen to acoustic signals (25) generated by the earpiece transducer (18) when the person's hand (14) is held against the person's head (16). The microphone transducer (20) is adapted to be coupled to a transmitter (32) and is carried by the glove member (12) at a location on the inside (22) of the person's hand (14) when the glove member (12) is worn on person's hand (14) to permit the person's mouth (28) to speak acoustic signals (23) into the microphone transducer (20) when the person's hand (14) is held against the person's head (16).

79 Claims, 6 Drawing Sheets

HAND ADAPTIVE TELEPHONE

BACKGROUND OF THE INVENTION

1. Field of the Invention

The present invention relates generally to telephones and more particularly to a hand adaptive telephone comprising a glove member, adapted to be worn on a person's hand, and a user interface mechanism carried by the glove member and adapted to be coupled to telephone circuitry.

2. Description of the Prior Art

A telephone is an instrument for reproducing sounds at a distance. The transmission of sounds between widely removed locations may or may not use connecting wires. A landline telephone having a twisted pair of wires connected to an RJ11 jack is an example of a telephone using a wired telephone connection. Cellular, cordless and PCS radiotelephones are examples telephones using of wireless telephone connection.

Most telephones have acoustic interfaces to permit a user of the telephone to communicate with a person at the remote location. An acoustic interface generally includes either an earpiece transducer or a loudspeaker transducer and a microphone transducer. The earpiece transducer or the loudspeaker transducer converts an electrical signal received from the remote location into an acoustic signal for the user to listen to. The microphone transducer converts an acoustic signal generated by the user's speech into an electrical signal for transmission to the remote location. Typically, the earpiece transducer and the microphone transducer are carried in a housing commonly known as a telephone handset and spaced apart from each other at a predetermined distance along a common axis. To communicate the user holds the telephone handset against the user's head so as to align the earpiece transducer with the user's ear and to align the microphone transducer with the user's mouth. Therefore, the user can communicate using the telephone handset by speaking into the microphone transducer while listening to the earpiece transducer.

Some problems associated with the known acoustic interface include dropping the telephone handset while in use, misplacing the telephone handset while not in use, expending time to retrieve the telephone handset to make or answer a telephone call and a physical discomfort caused by using the telephone handset.

These problems have been addressed in several ways. Some telephones are adapted to use a telephone headset having the earpiece transducer and the microphone, transducer, coupled to a telephone and adapted to be worn on the user's head so as to align the earpiece transducer with the user's ear and to align the microphone transducer with the user's mouth. Although this first solution addresses the problems mentioned hereinabove, this first solution is inappropriate when the user does not want to wear the telephone headset.

Some other telephones are carried on a wrist band and having the earpiece transducer and/or the microphone transducer moved to the palm side of the user's hand to align the earpiece transducer with the user's ear and to align the microphone transducer with the user's mouth when the user's hand is placed against the user's head. Although this second solution addresses the problems mentioned hereinabove, this second solution is inappropriate when the user does not want to move the earpiece transducer and/or the microphone or in cold weather when the user is wearing gloves. Moreover, this second solution is limited solely to telephones carried on the wrist band and are not adaptable to conventional portable telephone handsets or radiotelephone circuitry mounted on a card.

It is also generally known to integrate an earpiece transducer and a microphone transducer within particular garments, such as a hat, eyewear or a vest, wearable by the user. However, this third solution sometimes provides handsfree communication using a loudspeaker transducer and a microphone transducer and does not permit close coupled communication using an earpiece transducer. Further, a person may not always want to need to wear these types of garments.

Accordingly, there is a need for a hand adaptive telephone comprising a glove member adapted to be worn on a person's hand and carrying a user interface mechanism. The user interface mechanism may be, for example, an acoustic interface mechanism including an earpiece transducer and a microphone transducer carried by the glove member at a location on an inside of the person's hand when the glove member is worn on the person's hand.

SUMMARY OF THE INVENTION

A hand adaptive telephone comprises a glove member and a user interface mechanism. The glove member is adapted to be worn on a hand of a person. The user interface mechanism is carried by the glove member and adapted to be coupled to telephone circuitry.

In accordance with one embodiment of the present invention, the user interface mechanism comprises an earpiece transducer and a microphone transducer. The earpiece transducer is adapted to be coupled to a receiver and is carried by the glove member at a location on an inside of the hand of the person when the glove member is worn on the hand of the person to permit an ear of the person to listen to acoustic signals generated by the earpiece transducer when the hand of the person is held against a head of the person. The microphone transducer is adapted to be coupled to a transmitter and is carried by the glove member at a location on the inside of the hand of the person when the glove member is worn on the hand of the person to permit a mouth of the person to speak acoustic signals into the microphone transducer when the hand of the person is held against the head of the person. The microphone transducer and the earpiece transducer are spaced apart by a predetermined distance along a common axis.

DETAILED DESCRIPTION OF THE PREFERRED EMBODIMENTS

Figure 1:
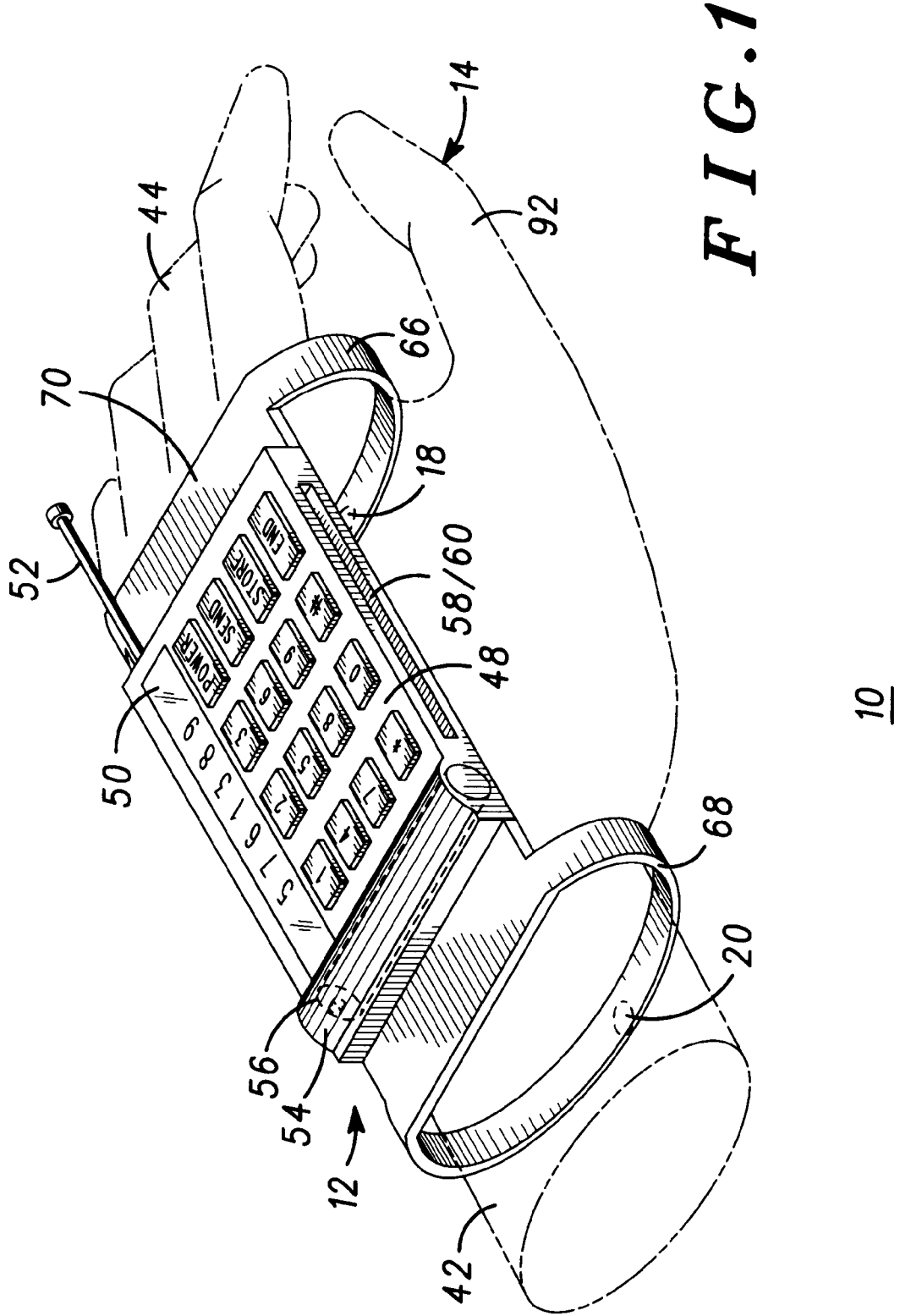
FIG. 1 illustrates, in a top, rear and right side perspective view, a first embodiment of a hand adaptive telephone including a glove member adapted to be worn on a person's hand.
Figure 2:
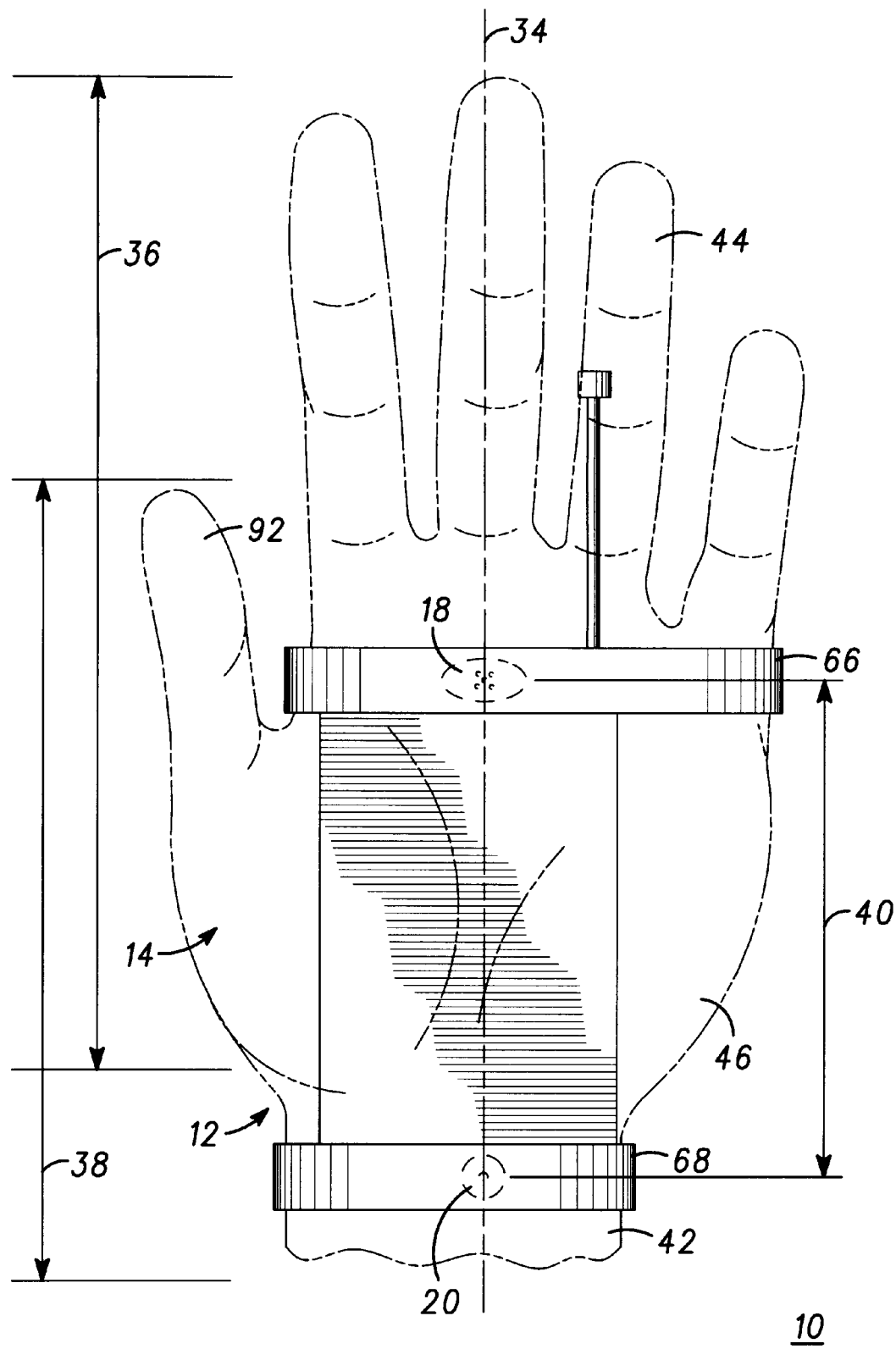
FIG. 2 illustrates, in a bottom planar side view, the first embodiment of the hand adaptive telephone including the glove member of FIG. 1 adapted to be worn on the person's hand.
Figure 3:
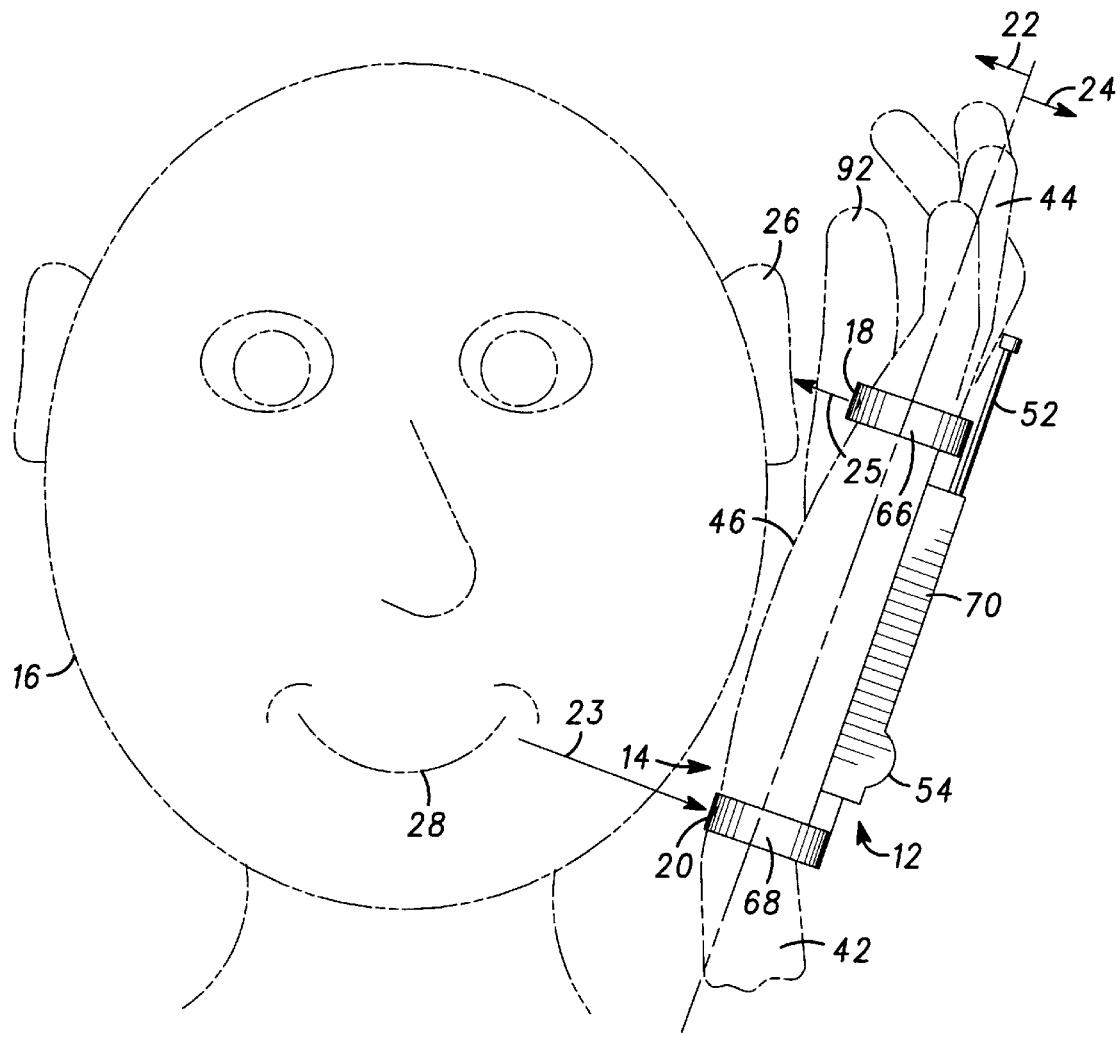
FIG. 3 illustrates, in a left side elevation view, the first embodiment of the hand adaptive telephone including the glove member of FIGS. 1 and 2 adapted to be worn on the person's hand wherein the person's hand is held next to the person's head.

FIGS. 1, 2 and 3 together illustrate a first embodiment of a hand adaptive telephone 10 having a glove member 12 adapted to be worn on a person's hand 14. FIG. 1 illustrates, in a top, rear and right side perspective view, a first embodiment of a hand adaptive telephone 10 including a glove member 12 adapted to be worn on a person's hand 14. FIG. 2 illustrates, in a bottom planar side view, the first embodiment of the hand adaptive telephone 10 including the glove member 12 of FIG. 1 adapted to be worn on the person's hand 14. FIG. 3 illustrates, in a left side elevation view, the first embodiment of the hand adaptive telephone 10 including the glove member 12 of FIGS. 1 and 2 adapted to be worn on the person's hand 14 wherein the person's hand is held next to the person's head 16.

A hand adaptive telephone 10 comprises a glove member 12 adapted to be worn on a hand 14 of a person and a user interface mechanism carried by the glove member. Preferably, the user interface mechanism includes a first earpiece transducer 18 and a first microphone transducer 20. The first earpiece transducer 18 is adapted to be coupled to a receiver 30 and carried by the glove member 12 at a location on an inside 22 of the hand 14 of the person when the glove member 12 is worn on the hand 14 of the person to permit an ear 26 of the person to listen to acoustic signals 25 generated by the first earpiece transducer 18 when the hand 14 of the person is held against a head 16 of the person. The first microphone transducer 20 is adapted to be coupled to a transmitter 32 and carried by the glove member 12 at a location on the inside 22 of the hand 14 of the person when the glove member 12 is worn on the hand 14 of the person to permit a mouth 28 of the person to speak acoustic signals 23 into the first microphone transducer 20 when the hand 14 of the person is held against the head 16 of the person.

The first earpiece transducer 18 and the first microphone transducer 20 together provide an acoustic interface for the person using the hand adaptive telephone 10. The acoustic interface advantageously provides the person with close coupled private listening conditions and semiprivate speaking conditions.

Preferably, the hand adaptive telephone 10 provides wireless communications, such as, for example, over radio waves or infrared waves. In the case of radio transmission, the transmitter 32 and the receiver 30 are a radio transmitter and a radio receiver, respectively. Preferably, the radio transmitter and a radio receiver operate in a cellular band of radio frequencies at about 900 MHz. However, any radio frequency band may be used such as, for example, the cordless band of radio frequencies at about 49 MHz or the PCS band of radio frequencies at about 1800 MHz. Further, the radio transmitter and the radio receiver operating in the cellular band of radio frequencies may use any cellular standard for communicating such as, for example, analog standards such as AMPS (Advanced Mobile Phone Service) and NAMPS (Narrowband Advanced Mobile Phone Service) and digital standards such as GSM (Group Special Mobile), TDMA (Time Division Multiple Access) and CDMA (Code Division Multiple Access). Alternatively, the hand adaptive telephone 10 may provide wired communications, such as, for example, by a standard twisted pair wired connected to an RJ11 jack.

The hand adaptive telephone 10 provides the person with the following advantages while the glove member 12 is worn on the person's hand 14. The person cannot drop a telephone handset while in a call or misplace the telephone handset while not in a call. The person can make or answer telephone calls more quickly because the person does not need to expend the time to retrieve a telephone handset. The hand adaptive telephone 10 is physically more comfortable than holding a separate handset because the person's own hand 14 provides the contoured shape of the acoustic interface. Further, the hand adaptive telephone 10 provides the user with a close coupled acoustic interface when wearing a headset having an earpiece transducer and a microphone transducer is not the person's preference or option. The hand adaptive telephone 10 may be advantageously used by active people who need readily available portable communications. Applications for the hand adaptive telephone 10 in the work environment include industrial maintenance, manufacturing, warehousing, retail, airline ground support, financial securities brokers/traders and medical personnel. Applications for the hand adaptive telephone 10 in the recreational environment include walking, jogging, skiing, sailing and flying.

Generally, the inside 22 of the person's hand 14 refers to the palm side of the person's hand 14 and includes the inside 22 of the person's fingers 44, the inside 22 of the person's palm 46 and the inside 22 of the person's wrist 42 which is attached to the person's hand 14. Further, the outside 24 of the person's hand 14 refers to the back side of the person's hand 14 having the person's knuckles and includes the outside 24 of the person's fingers 44, the outside 24 of the person's palm 46 and the outside 24 of the person's wrist 42 which is attached to the person's hand 14. Alternatively, the term "inside" may be referred to as anterior, front or bottom and the term "outside" may be referred to as posterior, back or top.

The first microphone transducer 20 and the first earpiece transducer 18 are spaced apart by a predetermined distance 40 along a common axis. The common axis is preferably a longitudinal axis 34 of the person's hand 14 which runs parallel with the person's fingers 44. By locating the first microphone transducer 20 and the first earpiece transducer 18 on the longitudinal axis 34, the first microphone transducer 20 and the first earpiece transducer 18 are in the best location for aligning with the person's mouth 28 when the person's hand 14 is held against the person's head 16. Alternatively, the common axis may be at any angle across the inside 22 of the person's hand 14.

Once the glove member 12 is attached to the person's hand 14 the first earpiece transducer 18 and the first microphone transducer 20 are disposed in fixed locations on the inside 22 of the person's hand 14. The first earpiece transducer 18 may be located at an earpiece position 36 inside 22 the user's palm 46 or fingers 44. The first microphone transducer 20 may be located at a microphone position 38 inside 22 the person's wrist 42 or palm 46. Preferably, the first earpiece transducer 18 is disposed at the top of the person's palm 46 just below the person's fingers 44, as shown in FIGS. 1, 2 and 3, and the first microphone, transducer 20 is disposed inside 22 the person's wrist 42 just below the person's palm 46, as shown in FIGS. 1, 2 and 3. These locations advantageously permit the person to open and close their hand 14 and to use their fingers 44 with minimal physical interference from the first earpiece transducer 18 and the first microphone transducer 20 while providing for comfortable alignment with the user's ear 26 and mouth, respectively, when the person's hand 14 is placed next to the person's head 16. The predetermined distance 40 between the first microphone transducer 20 and the first earpiece transducer 18 may be adjusted by the person to provide for optimal acoustic coupling between the user's mouth 28 and the first microphone transducer 20 and between the user's ear 26 and the first earpiece transducer 18. The adjustment may be accomplished by adjusting features of the glove member 12 as explained further hereinbelow.

Alternatively, the glove member 12 further comprises a first keypad 48 adapted to be coupled to the transmitter 32 and carried by the glove member 12 at a location on an outside 24 of the hand 14 of the person when the glove member 12 is worn on the hand 14 of the person to permit the person to input information. This location advantageously permits the inside 22 of the person's hand 14 to be unobstructed to permit the person to use the hand 14 and to permit the user to actuate individual keys of the first keypad 48 while the person's hand 14 is in use. The first keypad 48 is constructed using conventional keypad technology, such as, for example, touch screen keys, membrane keys, silicone rubber keys or plastic keys. The first keypad 48 generally includes individual keys which are actuated by pressure and a switch (not shown) disposed beneath each individual key which generates an open circuit and a closed circuit indicative of each individual key being not pressed or pressed, respectively. Preferably, the first keypad 48 is thin being of a dimension of 5 mm or less. Further, the first keypad 48 may be rigid or flexible to conform to movements of the person's hand 14.

Preferably, rows of the individual keys of the first keypad 48 are positioned substantially parallel to the longitudinal axis 34 of the hand 14 of the person so that they are substantially parallel with the person's fingers 44. This keypad orientation advantageously permits comfortable actuation of the first keypad 48 on the person's hand 14 wearing the glove member 12 with finger's of the person's hand 14 not wearing the glove member. For example, when the glove member 12 is worn on the person's left hand 14, as shown in FIG. 1, 2 and 3, the first keypad 48 may be move to a comfortable position by placing the person's left forearm at a 45 degree angle relative to the front of the person by simply bending the person's forearm in front of the person, as if a wrist watch were being viewed. The person's left hand 14 is permitted to remain in a comfortable resting position substantially aligned with the person's wrist 42 along the longitudinal axis 34 of the person's hand 14. The person is permitted to actuate the individual keys on the first keypad 48 by pressing the individual keys with a finger on the person's right hand while the person's left hand 14 is positioned in front of the person. To make the glove member 12 having this keypad orientation be adaptable to either the person's right hand or the persons left hand 14, either the first keypad 48 would need to be repositioned 180 degrees or the first earpiece transducer 18 and the first microphone transducer 20 would need to be exchange positions.

This keypad orientation is preferable over having the rows of the individual keys of the first keypad 48 positioned substantially perpendicular to the longitudinal axis 34 of the hand 14 of the person because the person does not need to outwardly bend the person's left hand 14 relative to the person's left wrist 42 and move the person's left hand 14 in front of the person in order to position the first keypad 48 in a proper position to be actuated by a finger on the person's right hand. However, an advantage of having the rows of the individual keys of the first keypad 48 positioned substantially perpendicular to the longitudinal axis 34 of the person's hand 14 is that the glove member 12 may be readily adaptable to either the person's right hand or the persons left hand 14.

Alternatively, the glove member 12 further comprises a first display 50 adapted to be coupled to at least one of the transmitter 32 and the receiver and carried by the glove member 12 at a location on an outside 24 of the hand 14 of the person when the glove member 12 is worn on the hand 14 of the person to provide the person with information. This location advantageously permits the inside 22 of the person's hand 14 to be unobstructed to permit the person to use the hand 14 and to permit the user to view the display while the person's hand 14 is being used. The first display 50 is constructed using conventional display technology, such as, for example, liquid crystal display, light emitting diodes and vacuum fluorescent. The first display 50 generally includes individual display segments, such as dots or lines, which dynamically form characters, such as numbers or letters, when electrically driven by display driver circuitry (not shown). The drive circuitry may be carried by the glove member 12 or may be carried with the transmitter 32 or the receiver 30. Preferably, the first display 50 is thin being of a dimension of 5 mm or less. Further, the first display 50 may be rigid or flexible to conform to movements of the person's hand 14. Preferably, the first display 50 is positioned substantially parallel to a longitudinal axis 34 of the hand 14 of the person and adjacent to a first side of the first keypad 48 being located opposite to a second side of the first keypad 48 being located adjacent to a thumb 92 of the hand 14 of the person. This display orientation advantageously permits comfortable viewing of the first display 50 on the person's hand 14 wearing the glove member 12 for similar advantageous reasons as explained hereinabove with reference to the first keypad 48.

Alternatively, the glove member 12 further comprises a battery receiving mechanism 54 carried by the glove member 12 and adapted to mechanically receive a battery and to mechanically secure the battery to the glove member. The battery receiving mechanism 54 may have any number of conventional designs including a flexible pocket or a rigid receptacle. The battery may be any type of battery such as, alkaline, lithium ion, lithium polymer or nickel cadmium. The size of the battery receiving mechanism 54 and the battery is dependent upon the amount of current consumed by the hand adaptive telephone 10 and the expected time period of use of the hand adaptive telephone 10 before the battery is discharged. Preferably, the battery receiving mechanism 54 is located on the outside 24 of the hand 14 of the person when the glove member 12 is worn on the hand 14 of the person. This location advantageously permits the inside 22 of the person's hand 14 to be unobstructed to permit the person to use the hand 14.

Alternatively, the glove member 12 further comprises a first antenna 52 carried by the glove member 12 and electrically coupled to the transmitter 32 and the receiver 30. The first antenna 52 is constructed according to conventional radio design principles. The first antenna 52 may have a fixed position or be telescoping, as shown in FIGS. 1, 2 and 3. The first antenna 52 may extend outside of the glove member 12 or be embedded inside the glove member. Preferably, the first antenna 52 is carried by the glove member 12 at a location on the outside 24 of the hand 14 of the person when the glove member 12 is worn on the hand 14 of the person. The first antenna 52 is moveable between a stowed position and an unstowed position. Preferably, the first antenna 52 is positioned substantially parallel to a longitudinal axis 34 of the hand 14 of the person when the antenna is moved to at least the unstowed position. This location advantageously permits the inside 22 of the person's hand 14 to be unobstructed to permit the person to use the hand 14 and to maximize radiation efficiency of the first antenna when the person's hand 14 is held next to the person's head 16 while a phone call is in process.

Preferably, the glove member 12 further comprises a first connector 51 carried by the glove member 12 and having a first set of contacts electrically coupled to the first earpiece transducer 18 (when present), the first microphone transducer 20 (when present), the first keypad 48 (when present), the first display 50 (when present), the first antenna 52 (when present) and the battery 56 (when present). The first connector 51 is adapted to electrically couple the first earpiece transducer 18 to the receiver 30, is adapted to electrically couple the first microphone transducer 20 to the transmitter 32, is adapted to electrically couple the first keypad 48 to the transmitter 32, is adapted to electrically couple the first display 50 to at least one of the transmitter 32 and the receiver 30, is adapted to electrically couple the first antenna 52 to the transmitter 32 and the receiver 30, and is adapted to electrically couple the battery to the first earpiece transducer 18, the first microphone transducer 20, the first keypad 48, the first display 50, the transmitter 32 and the receiver 30. The first connector 51 may be may have any construction including, for example, a receptacle at one end of wires or a flex circuit running between the receptacle and the circuitry in the glove member 12 or a set of terminals attached to the glove member 12 at a fixed position. The construct-ion of the first connector 51 depends on the construction of a housing carrying the transceiver 32 and the receiver 30 and the location of the transceiver and the receiver relative to the glove member.

Preferably, the glove member 12 further comprises a circuitry receiving mechanism 58 carried by the glove member 12 and adapted to mechanically receive the transmitter 32 and the receiver 30 and to mechanically secure the transmitter 32 and the receiver 30 to the glove member. The circuitry receiving mechanism 58 can have any construction or dimensions necessary to receive and secure the transmitter 32 and the receiver 30 and depend on the construction and dimensions of a housing carrying the transmitter 32 and the receiver 30. Preferably, the circuitry receiving mechanism 58 is located on the outside 24 of the hand 14 of the person when the glove member 12 is worn on the hand 14 of the person. The location on the outside 24 of the hand 14 of the person includes the outside 24 or the back side of the person's wrist 42. This location advantageously permits the inside 22 of the person's hand 14 to be unobstructed to permit the person to use the hand 14.

Preferably, the circuitry receiving mechanism 58 further comprises a card slot 60 adapted to receive a card carrying the transmitter 32 and the receiver 30 and adapted to secure the card to the glove member, as shown in FIG. 1. The card slot 60 is preferably located below the first keypad 48 and on a side of the glove member 12 facing the thumb 92 of the person's hand 14 to permit easy insertion and removal of the card. The card carrying the transmitter 32 and the receiver 30 may be of any construction and dimensions including those dimensions of a credit card or a miniature GSM SIM card. When the card slot 60 is employed the first connector 51 comprises a set of contacts disposed inside the card slot 60 and adapted to contact corresponding terminals on the card. Alternatively, the circuitry receiving mechanism 58 further comprises a pocket 62 which may or may not have a transparent window 64 as explained herein with reference to FIG. 5.

Preferably, the glove member 12 is constructed of a first strap 66, a second strap 68 and a support member 70. The first strap 66 carries the first earpiece transducer 18 and is adapted to be positioned across the inside 22 of a palm 46 or finger of the hand 14 of the person. The second strap 68 carries the first microphone transducer 20 and is adapted to be positioned across the inside 22 of a wrist 42 of the hand 14 of the person. The support member 70 is mechanically coupled to the first strap 66 and the second strap 68 and is adapted to be positioned on the outside 24 of the hand 14 and the wrist 42 of the person when the glove member 12 is worn on the hand 14 of the person. The support member 70 carries; the first connector 51, the circuitry receiving mechanism 58 including the transmitter 32 and the receiver 30 (when present), the first keypad 48 (when present), the first display 50 (when present), the first antenna 52 (when present) and the battery receiving mechanism 54 (when present) including the battery 56 (when present). The glove member 12 may have any construction or dimensions which make the glove member 12 comfortable on the person's hand 14. The first strap 66 may be positioned between or around the sides of all of the person's fingers 44 or around the ends of one of the person's fingers 44. To accommodate a variety of hand shapes and sizes with a generic design of a glove member, each of the first strap 66 and the second strap 68 is adjustable with reference to the support member 70 using, for example, Velcro (TM), snaps, ties, hooks, latches, elastic or the like. Further, the length of the support member 70 is adjustable along the longitudinal axis 34 of the person's hand 14 using, for example, Velcro (TM), snaps, ties, hooks, latches, elastic or the like. By adjusting the first strap 66, the second strap 68 and the support member 70, the person has the ability not only to conform the glove member 12 to the person's hand 14, but also to adjust the predetermined distance 40 between the first microphone transducer 20 and the first earpiece transducer 18 to provide for optimal acoustic coupling between the user's mouth 28 and the first microphone transducer 20 and between the user's ear 26 and the first earpiece transducer 18 when the person's hand 14 is held against the person's head 16. The material of the glove member 12 is constructed according to the anticipated environment of use of the glove member, including for example, considerations of moisture, dust, physical impact and temperature extremes.

Figure 4:
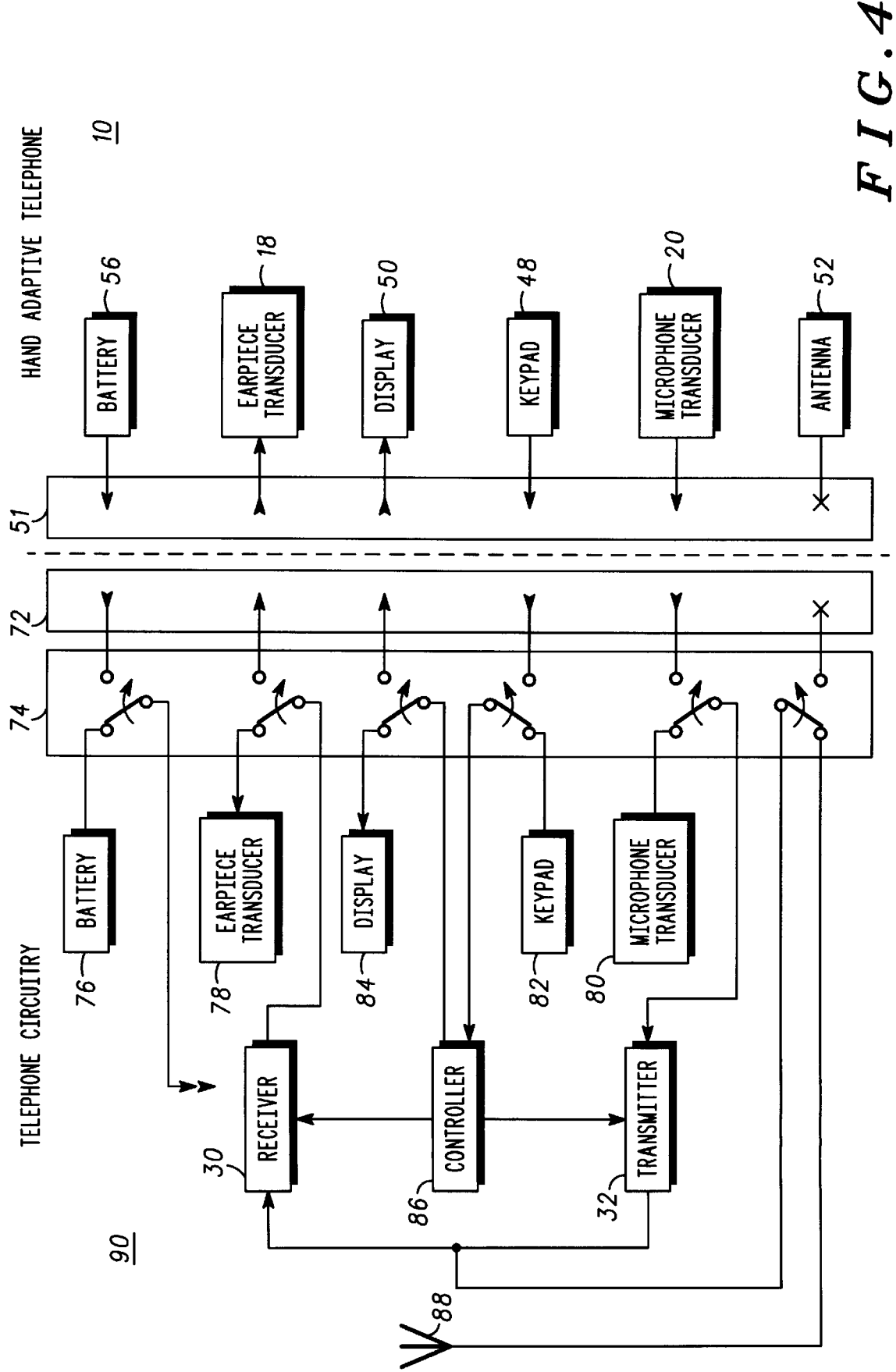
FIG. 4 illustrates a block diagram of telephone circuitry adapted to be coupled to circuitry in the first embodiment of the hand adaptive telephone of FIGS. 1, 2 and 3.

FIG. 4 illustrates a block diagram of telephone circuitry adapted to be coupled to circuitry in the first embodiment of the hand adaptive telephone 10 of FIGS. 1, 2 and 3. The hand adaptive telephone 10 generally includes the first earpiece transducer 18, the first microphone transducer 20, the first keypad 48, the first display 50, the first antenna 52, the first battery 56 and the first connector 51. The telephone circuitry generally includes a transmitter 32, a receiver 30, a controller 86, a second earpiece transducer 78, a second microphone transducer 80, a second keypad 82, a second display 84, a second antenna 88, a switch 74, a second connector 72 and a second battery 76. Individually, each of the elements of the hand adaptive telephone 10 and the telephone circuitry is well known in the art.

In the telephone circuitry, the second earpiece transducer 78 is carried by the telephone and electrically coupled to the receiver 30. The second microphone transducer 80 is carried by the telephone and electrically coupled to the transmitter 32. The second keypad 82 is carried by the telephone and electrically coupled to the transmitter 32. The second display 84 is carried by the telephone and electrically coupled to at least one of the transmitter 32 and the receiver 30. The second antenna 88 is carried by the telephone and electrically coupled to the transmitter 32 and the receiver 30. The second connector 72 is carried by the telephone and having a second set of contacts electrically coupled to the second earpiece transducer 78, the second microphone transducer 80, the second keypad 82, the second display 84, the second antenna 88 and the second battery 76. The first connector 51 is adapted to be mechanically coupled to the second connector 72 to permit the first set of contacts to be electrically coupled to the second set of contacts. The switch 74 is adapted to electrically enable the first earpiece transducer 18, the first microphone transducer 20, the first keypad 48, the first display 50, the first antenna 52 and the first battery 56 and is adapted to electrically disable the second earpiece transducer 78, the second microphone transducer 80, the second keypad 82, the second display 84, the second antenna 88 and the second battery 76 when the first connector 51 is mechanically coupled to the second connector 72. The switch 74 is adapted to electrically disable the first earpiece transducer 18, the first microphone transducer 20, the first keypad 48, the first display 50, the first antenna 52 and the first battery 56 and is adapted to electrically enable the second earpiece transducer 78, the second microphone transducer 80, the second keypad 82, the second display 84, the second antenna 88 and the second battery 76 when the first connector 51 is mechanically decoupled from the second connector 72.

The hand adaptive telephone 10 includes, preferably, the first microphone transducer 20 and the first earpiece transducer 18 to provide the acoustic interface for the glove member 12 and the first connector 51 to connect the first microphone transducer 20 and the first earpiece transducer 18 to the transmitter 32 and the receiver 30, respectively. The hand adaptive telephone 10 optionally includes the first keypad 48, the first display 50, the first antenna 52 and the first battery 56. The first keypad 48 and/or the first display 50 provides an information interface to permit the user to enter tactile data and/or receive visual data, respectively. The first antenna 52 provides a radio air interface to permit signals to be transmitted from or received by the transmitter 32 and the receiver 30, respectively. The first battery 56 provides a power supply interface to provide a primary or secondary power source for the hand adaptive telephone. In summary, any portion of the user interface mechanism may be carried by the glove member alone or in combination with any other portion of the user interface mechanism to provide a variety of combinations for particular applications.

The second connector 72 carried by the telephone may be constructed of a single connector or separate connectors. For example, as separate connectors, a separate connector may be used for both the second earpiece transducer 78 and the second microphone transducer 80, having the construction of a phone jack, as is well known in the art and implemented in present day radiotelephones. Further, as separate connectors, a separate connector may be used for the second keypad 82 and the second display 84, having the construction of an accessory jack, as is well known in the art and implemented in present day radiotelephones. In present day radiotelephones, the accessory jack is typically disposed on a bottom side of the radiotelephone housing which is below a keypad. The accessory jack has conductors which route signals from a remote keypad or display over a communication bus to a controller 86 in the radiotelephone. Further, as separate connectors, a separate connector may be used for the second antenna 88, having the construction of a radio frequency connector, as is well known in the art and implemented in present day radiotelephones. In present day radiotelephones, the radio frequency connector is typically disposed on a bottom side of the radiotelephone housing which is below a keypad. The radio frequency connector has conductors which route signals from a antenna to the transmitter 32 and the receiver 30 in the radiotelephone. The first connector 51 may also use separate connectors or an integrated single connector in an analogous manner to that explained for the second connector 72.

The switch 74 in the telephone circuitry may be an electrical switch 74 or a mechanical switch 74 and may be integrated into a single package or disintegrated into separate packages. The switch 74, preferably, switches between the first microphone transducer 20 and the second microphone transducer 80 and between the first earpiece transducer 18 and the second earpiece transducer 78. The switch 74 between the respective transducers is necessary to prevent acoustic feedback which manifests itself by howling sounds. The switch 74 between the first display 50 and the second display 84 is optional, since both the first display 50 and the second display 84 may display information simultaneously without causing a problem in the telephone circuitry. The switch 74 between the first keypad 48 and the second keypad 82 is also optional, since information may be entered by either the first keypad 48 and the second keypad 82 without causing a problem in the telephone circuitry. One advantage to disabling the second keypad 82 when the first keypad 48 is enabled is to prevent falsing of the second keypad 82 when the second keypad 82 is positioned so as to be prone to falsing. The switch 74 between the first battery 56 and the second battery 76 is also optional, since power may be received by either or both of the first battery 56 and the second battery 76 without causing a problem in the telephone circuitry. One advantage to controlling the switch 74 between the first battery 56 and the second battery 76 is to control charge or discharge rates for each of the first battery 56 and the second battery 76.

Figure 5:
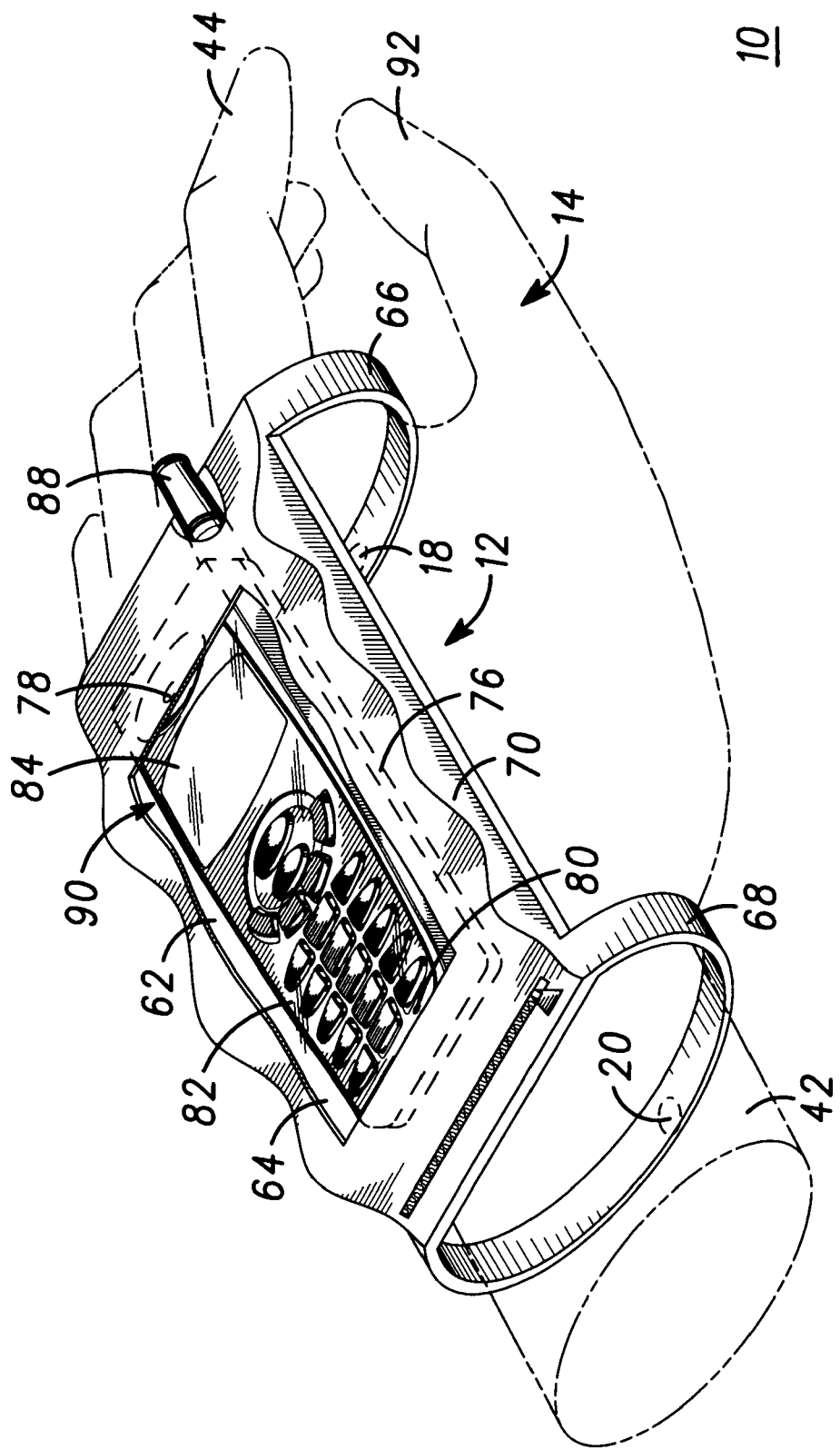
FIG. 5 illustrates, in a top, rear and right side perspective view, a second embodiment of a hand adaptive telephone including a glove member adapted to be worn on a person's hand.

Alternatively, the glove member 12 does not need the first connector 51 or the circuitry receiving mechanism 58 when the transmitter 32 and the receiver 30 along with the appropriate acoustic, information, air and power supply interfaces are permanently integrated into the glove member. Preferably, the glove member 12 is used as an accessory to complement the use of a conventional telephone, as shown in FIG. 5, or a card having the transmitter 32 and the receiver 30, as shown in FIG. 1. However, an integrated design may be better suited for particular applications.

FIG. 5 illustrates, in a top, rear and right side perspective view, a second embodiment of a hand adaptive telephone 10 including a glove member 12 adapted to be worn on a person's hand 14. Generally, FIG. 5 illustrates a conventional radiotelephone handset 90 mechanically coupled to the outside 24 of the glove member 12 and electrically coupled to the first earpiece transducer 18 and the first microphone transducer 20 of the glove member. Therefore, the acoustic interface, including the first earpiece transducer 18 and the first microphone transducer 20, of the glove member 12 is enabled by being connected to the transmitter 32 and the receiver 30 in the radiotelephone and the acoustic interface, including the second earpiece transducer 78 and the second microphone transducer 80, of the radiotelephone is disabled by being disconnected to the transmitter 32 and the receiver 30 in the radiotelephone when the radiotelephone is used in conjunction with the glove member. In this embodiment, the second keypad 82, the second display 84, the second battery 76 and the second antenna 88 of the radiotelephone is operable with the glove member, since the glove member 12 does not have a first keypad 48, a first display 50, a first battery 56 or a first antenna 52. Therefore, a conventional radiotelephone 90 is adaptable for use in a conventional hand held application and a glove member 12 application.

This second embodiment of the glove member 12 illustrates the circuitry receiving mechanism 58 as a pocket 62 or pouch adapted to receive the telephone carrying the transmitter 32 and the receiver 30 and adapted to secure the telephone to the glove member. The pocket 62 has a zipper opening near the person's wrist to receive and secure the telephone 90. The pocket 62 has the construction and dimensions compatible with the structure and the dimensions of the telephone. The pocket 62 is adjustable to securely retain the telephone to the glove member. The telephone is preferably orientated to have its longitudinal axis substantially parallel with the longitudinal axis of the person's hand 14, or otherwise parallel with the person's fingers 44, as shown in FIG. 5. This orientation locates the telephone in the best compromised position for entering information into the keypad, to view information in the display, to comfortably hold the telephone on the outside 24 of the person's hand 14 and to position the antenna in an optimal position when the glove member 12 is placed next to the person's head 16.

When the telephone has a keypad and/or a display, the pocket 62 further comprises a transparent window 64 positioned opposite to the keypad and the display when the telephone is received and secured by the pocket 62. The transparent window 64 may be open to form a frame surrounding the keypad and/or the display or may be a flexible transparent sheet covering the keypad and/or the display. The transparent window 64 permits the person to use the keypad and/or the display while the telephone is held in the pocket 62.

Figure 6:
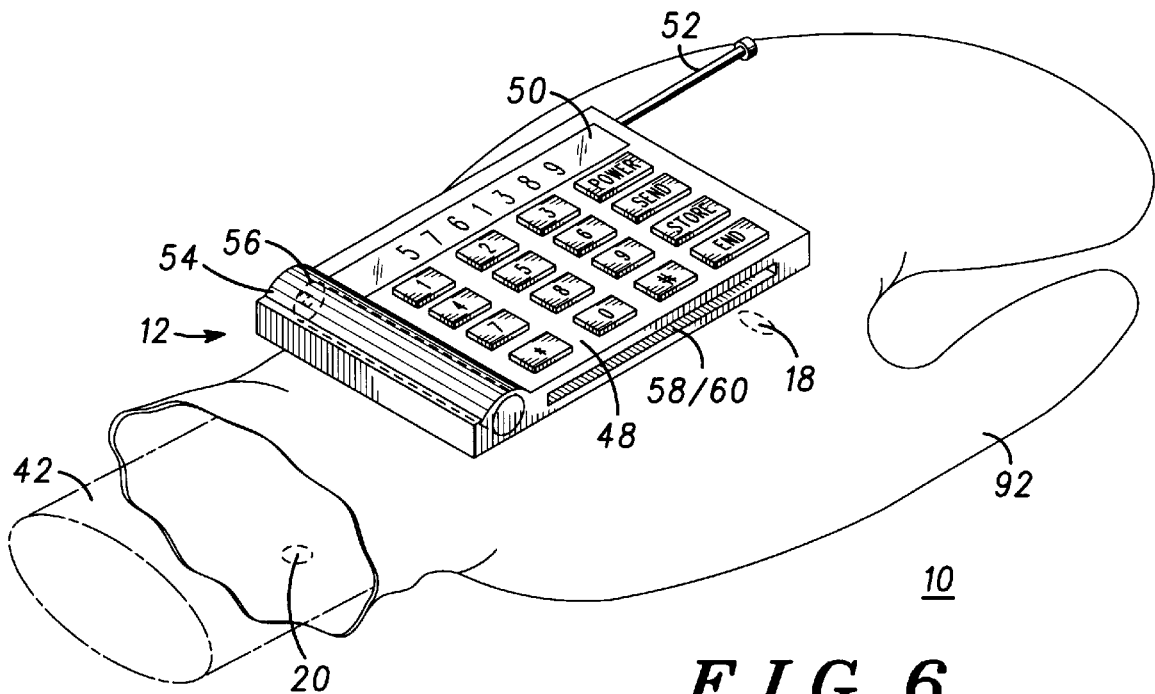
FIG. 6 illustrates, in a top, rear and right side perspective view, a third embodiment of a hand adaptive telephone including a glove member adapted to be worn on a person's hand.

FIG. 6 illustrates, in a top, rear and right side perspective view, a third embodiment of a hand adaptive telephone 10 including a glove member 12 adapted to be worn on a person's hand 14. Generally, FIG. 6 illustrates the first embodiment of a glove member 12 shown in FIG. 1 except that the glove member 12 is now integrated into an actual glove in the form of a mitten fully covering the person's hand 14. The glove member 12 forms the mitten having a first portion adapted to receive four fingers 44 of the hand 14 of the person and having a second portion adapted to receive a thumb 92 of the hand 14 of the person. The mitten is adapted to fully cover the person's hand 14.

Figure 7:
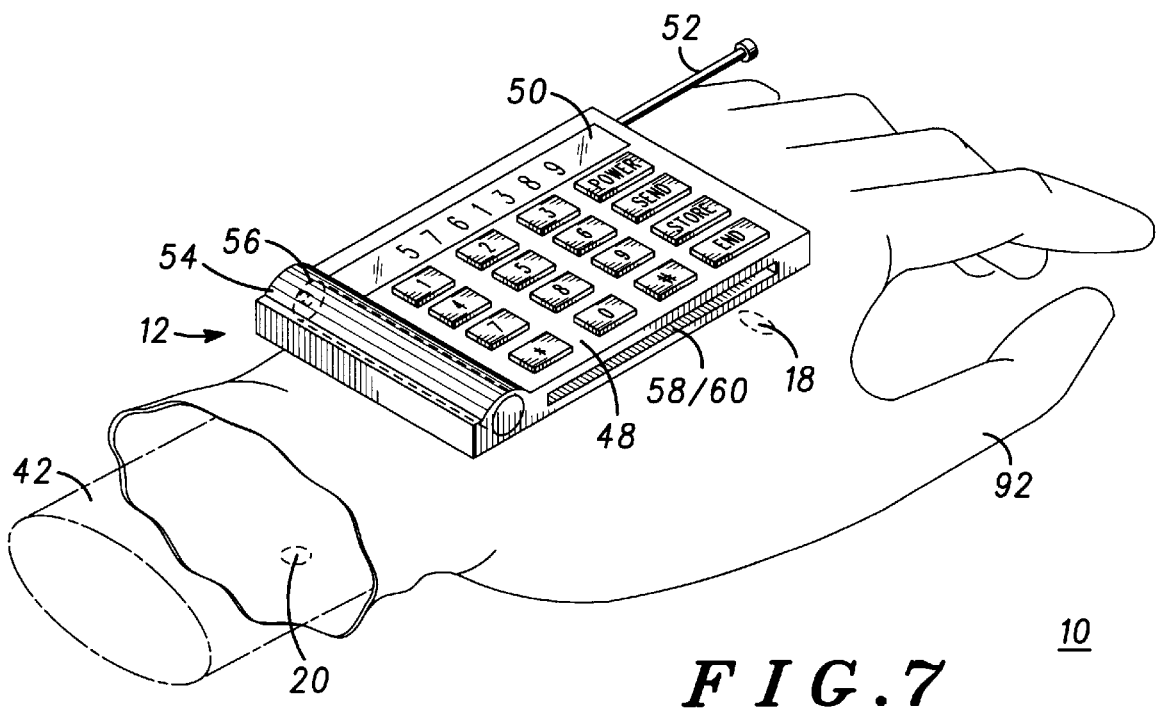
FIG. 7 illustrates, in a top, rear and right side perspective view, a fourth embodiment of a hand adaptive telephone including a glove member adapted to be worn on a person's hand.

FIG. 7 illustrates, in a top, rear and right side perspective view, a fourth embodiment of a hand adaptive telephone 10 including a glove member 12 adapted to be worn on a person's hand 14. Generally, FIG. 7 illustrates the first embodiment of a glove member 12 shown in FIG. 1 except that the glove member 12 is now integrated into an actual glove in the form of a fingered glove fully covering the person's hand 14. The glove member 12 forms a glove having four individual portions adapted to receive each of four fingers 44 of the hand 14 of the person, respectively, and having another portion adapted to receive a thumb 92 of the hand 14 of the person. The glove is adapted to fully cover the hand 14 of the person.

While the present invention has been described with reference to illustrative embodiments thereof, it is not intended that the invention be limited to these specific embodiments. Those skilled in the art will recognize that variations and modifications can be made without departing from the spirit and scope of the invention as set forth in the appended claims.

What is claimed is:

1. A hand adaptive telephone comprising:
   a glove member adapted to be worn on a hand of a person; and
   a user interface mechanism, carried by the glove member and adapted to be coupled to telephone circuitry including a receiver and a transmitter, having:
      a first earpiece transducer adapted to be coupled to the receiver and carried by the glove member at a location on an inside of the hand when the glove member is worn on the hand;
      a first microphone transducer adapted to be coupled to the transmitter and carried by the glove member at a location on the inside of the hand when the glove member is worn on the hand; and
      a first connector having a first set of contacts electrically coupled to the first earpiece transducer and the first microphone transducer, the first connector being adapted to electrically couple the first earpiece transducer to the receiver and being adapted to electrically couple the first microphone transducer to the transmitter;
   wherein the telephone circuitry comprises:
      a second earpiece transducer coupled to the receiver;
      a second microphone transducer coupled to the transmitter;
      a second connector having a second set of contacts electrically coupled to the second earpiece transducer and the second microphone transducer, the first connector being adapted to be mechanically coupled to the second connector to permit the first set of contacts to be electrically coupled to the second set of contacts; and
      a switch, adapted to electrically enable the first earpiece transducer and the first microphone transducer and to electrically disable the second earpiece transducer and the second microphone transducer when the first connector is mechanically coupled to the second connector, and adapted to electrically disable the first earpiece transducer and the first microphone transducer and electrically enable the second earpiece transducer and the second microphone transducer when the first connector is mechanically decoupled from the second connector.

2. A hand adaptive telephone according to claim 1 wherein the user interface mechanism further comprises an information interface mechanism comprising:
   a first keypad adapted to be coupled to the transmitter and carried by the glove member at a location on an outside of the hand when the glove member is worn on the hand.

3. A hand adaptive telephone according to claim 2 wherein rows of keys of the first keypad are positioned substantially parallel to a longitudinal axis of the hand of the person.

4. A hand adaptive telephone according to claim 1 wherein the user interface mechanism further comprises an information interface mechanism comprising:
   a first display adapted to be coupled to at least one of the transmitter and the receiver and carried by the glove member at a location on an outside of the hand when the glove member is worn on the hand.

5. A hand adaptive telephone according to claim 4 wherein the first display is positioned substantially parallel to a longitudinal axis of the hand and adjacent to a first side of the first keypad being located opposite to a second side of the first keypad being located adjacent to a thumb of the hand.

6. A hand adaptive telephone according to claim 1 wherein the glove member further comprises:

a circuitry receiving mechanism adapted to mechanically receive the transmitter and the receiver and to mechanically secure the transmitter and the receiver to the glove member.

7. A hand adaptive telephone according to claim 6 wherein the circuitry receiving mechanism is located on the outside of the hand when the glove member is worn on the hand.

8. A hand adaptive telephone according to claim 6 wherein the circuitry receiving mechanism further comprises:

a card slot adapted to receive a card carrying the transmitter and the receiver and adapted to secure the card to the glove member.

9. A hand adaptive telephone according to claim 6 wherein the circuitry receiving mechanism further comprises:

a pocket adapted to receive a telephone carrying the transmitter and the receiver and adapted to secure the telephone to the glove member.

10. A hand adaptive telephone according to claim 9 wherein the telephone further comprises:

at least one of a keypad and a display, wherein the pocket further comprises a transparent window positioned opposite to the at least one of a keypad and a display when the telephone is received by the pocket.

11. A hand adaptive telephone according to claim 1 wherein the user interface mechanism further comprises a power supply interface comprising:

a battery receiving mechanism carried by the glove member and adapted to mechanically receive a battery and to mechanically secure the battery to the glove member.

12. A hand adaptive telephone according to claim 11 wherein the battery receiving mechanism is located on the outside of the hand when the glove member is worn on the hand.

13. A hard adaptive telephone according to claim 1 wherein the user interface mechanism further comprises an air interface comprising:

a first antenna carried by the glove member and electrically coupled to the transmitter and the receiver.

14. A hand adaptive telephone according to claim 13 wherein the first antenna is carried by the glove member at a location on the outside of the hand when the glove member is worn on the hand, wherein the first antenna is moveable between a stowed position and an unstowed position, and wherein the first antenna is positioned substantially parallel to a longitudinal axis of the hand of the person when the first antenna is moved to at least the unstowed position.

15. A hand adaptive telephone according to claim 1 wherein the glove member further comprises:

a first strap adapted to be positioned across the inside of a palm or finger of the hand;

a second strap adapted to be positioned across the inside of a wrist of the hand; and a support member mechanically coupled to the first strap and the second strap and adapted to be positioned on the outside of the hand and the wrist of the hand when the glove member is worn on the hand.

16. A hand adaptive telephone according to claim 1 wherein the glove member further comprises:

a mitten having a first portion adapted to receive four fingers of the hand and having a second portion adapted to receive a thumb of the hand, the mitten adapted to fully cover the hand.

17. A hand adaptive telephone according to claim 1 wherein the glove member further comprises:

a glove having four individual portions adapted to receive each of four fingers of the hand, respectively, and having another portion adapted to receive a thumb of the hand, the glove adapted to fully cover the hand.

18. A hand adaptive telephone comprising:

a glove member adapted to be worn on a hand of a person, the glove member comprising:

a first earpiece transducer adapted to be coupled to a receiver and carried by the glove member at a location on an inside of the hand of the person when the glove member is worn on the hand of the person to permit an ear of the person to listen to acoustic signal, generated by the first earpiece transducer when the hand of the person is held against a head of the person;

a first microphone transducer adapted to be coupled to a transmitter and carried by the glove member at a location on the inside of the hand of the person when the glove member is worn on the hand of the person to permit a mouth of the person to speak acoustic signals into the first microphone transducer when the hand of the person is held against the head of the person, the first microphone transducer and the first earpiece transducer being spaced apart by a predetermined distance along a common axis; and a first connector carried by the glove member and having a first set of contacts electrically coupled to the first earpiece transducer and the first microphone transducer, the first connector being adapted to electrically couple the first earpiece transducer to the receiver and being adapted to electrically couple the first microphone transducer to the transmitter, wherein the transmitter and the receiver are carried by a telephone, the telephone further comprising:

a second earpiece transducer carried by the telephone and electrically coupled to the receiver;

a second microphone transducer carried by the telephone and electrically coupled to the transmitter;

a second connector carried by the telephone and having a second set of contacts electrically coupled to the second earpiece transducer and the second microphone transducer, the first connector being adapted to be mechanically coupled to the second connector to permit the first set of contacts to be electrically coupled to the second set of contacts; and a switch carried by the telephone, the switch being adapted to electrically enable the first earpiece transducer and the first microphone transducer and being adapted to electrically disable the second earpiece transducer and the second microphone transducer when the first connector is mechanically coupled to the second connector, and the switch being adapted to electrically disable the first earpiece transducer and the first microphone transducer and being adapted to electrically enable the second earpiece transducer and the second microphone transducer when the first connector is mechanically decoupled from the second connector.

19. A hand adaptive telephone according to claim 18 wherein the glove member further comprises:

a first keypad adapted to be coupled to the transmitter and carried by the glove member at a location on an outside of the hand of the person when the glove member is worn on the hand of the person to permit the person to input information.

20. A hand adaptive telephone according to claim 19 wherein rows of keys of the first keypad are positioned substantially parallel to a longitudinal axis of the hand of the person.

21. A hand adaptive telephone according to claim 18 wherein the glove member further comprises:

a first display adapted to be coupled to at least one of the transmitter and the receiver and carried by the glove member at a location on an outside of the hand of the person when the glove member is worn on the hand of the person to provide the person with information.

22. A hand adaptive telephone according to claim 21 wherein the first display is positioned substantially parallel to a longitudinal axis of the hand of the person and adjacent to a first side of the first keypad being located opposite to a second side of the first keypad being located adjacent to a thumb of the hand of the user.

23. A hand adaptive telephone according to claim 18 wherein the glove member further comprises:

a circuitry receiving mechanism carried by the glove member and adapted to mechanically receive the transmitter and the receiver and to mechanically secure the transmitter and the receiver to the glove member.

24. A hand adaptive telephone according to claim 23 wherein the circuitry receiving mechanism is located on the outside of the hand of the person when the glove member is worn on the hand of the person.

25. A hand adaptive telephone according to claim 23 wherein the circuitry receiving mechanism further comprises:

a card slot adapted to receive a card carrying the transmitter and the receiver and adapted to secure the card to the glove member.

26. A hand adaptive telephone according to claim 23 wherein the circuitry receiving mechanism further comprises:

a pocket adapted to receive the telephone and adapted to secure the telephone to the glove member.

27. A hand adaptive telephone according to claim 26 wherein the telephone further comprises:

at least one of a keypad and a display, wherein the pocket further comprises a transparent window positioned opposite to the at least one of a keypad and a display when the telephone is received and secured by the pocket.

28. A hand adaptive telephone according to claim 18 wherein the glove member further comprises:

a battery receiving mechanism carried by the glove member and adapted to mechanically receive a battery and to mechanically secure the battery to the glove member.

29. A hand adaptive telephone according to claim 28 wherein the battery receiving mechanism is located on the outside of the hand of the person when the glove member is worn on the hand of the person.

30. A hand adaptive telephone according to claim 18 wherein the glove member further comprises:

a first antenna carried by the glove member and electrically coupled to the transmitter and the receiver.

31. A hand adaptive telephone according to claim 30 wherein the first antenna is carried by the glove member at a location on the outside of the hand of the person when the glove member is worn on the hand of the person, wherein the first antenna is moveable between a stowed position and an unstowed position, and wherein the first antenna is positioned substantially parallel to a longitudinal axis of the hand of the person when the first antenna is moved to at least the unstowed position.

32. A hand adaptive telephone according to claim 18 wherein the glove member further comprises:

a first strap for carrying the first earpiece transducer and adapted to be positioned across the inside of a palm or finger of the hand of the person;

a second strap for carrying the first microphone transducer and adapted to be positioned across the inside of a wrist of the hand of the person; and a support member mechanically coupled to the first strap and the second strap and adapted to be positioned on the outside of the hand and the wrist of the hand of the person when the glove member is worn on the hand of the person.

33. A hand adaptive telephone according to claim 18 wherein the glove member further comprises:

a mitten having a first portion adapted to receive four fingers of the hand of the person and having a second portion adapted to receive a thumb of the hand of the person, the mitten adapted to fully cover the hand of the person.

34. A hand adaptive telephone according to claim 18 wherein the glove member further comprises:

a glove having four individual portions adapted to receive each of four fingers of the hand of the person, respectively, and having another portion adapted to receive a thumb of the hand of the person, the glove adapted to fully cover the band of the person.

35. A hand adaptive telephone comprising:

a glove member adapted to be worn on a hand of a person, the glove member comprising:

a first earpiece transducer adapted to be coupled to a receiver and carried by the glove member at a location on an inside of the hand of the person when the glove member is worn on the hand of the person to permit an ear of the person to listen to acoustic signals generated by the first earpiece transducer when the hand of the person is held against a head of the person;

a first microphone transducer adapted to be coupled to a transmitter and carried by the glove member at a location on the inside of the hand of the person when the glove member is worn on the hand of the person to permit a mouth of the person to speak acoustic signals into the first microphone transducer when the hand of the person is held against the head of the person, the first microphone transducer and the first earpiece transducer being spaced apart by a predetermined distance along a common axis;

a first connector carried by the glove member and having a first set of contacts electrically coupled to the first earpiece transducer and the first microphone transducer, the first connector being adapted to electrically couple the first earpiece transducer to the receiver and being adapted to electrically couple the first microphone transducer to the transmitter; and a circuitry receiving mechanism carried by the glove member and adapted to mechanically receive the transmitter and the receiver and to mechanically secure the transmitter arid the receiver to the glove member, wherein the transmitter and the receiver are carried by a telephone, the telephone further comprising:

a second earpiece transducer carried by the telephone and electrically coupled to the receiver;

a second microphone transducer carried by the telephone and electrically coupled to the transmitter;

a second connector carried by the telephone and having a second set of contacts electrically coupled to the second earpiece transducer and the second microphone transducer, the first connector being adapted to be mechanically coupled to the second connector to permit the first set of contacts to be electrically coupled to the second set of contacts; and a switch carried by the telephone, the switch being adapted to electrically enable the first earpiece transducer and the first microphone transducer and being adapted to electrically disable the second earpiece transducer and the second microphone transducer when the first connector is mechanically coupled to the second connector, and the switch being adapted to electrically disable the first earpiece transducer and the first microphone transducer and being adapted to electrically enable the second earpiece transducer and the second microphone transducer when the first connector is mechanically decoupled from the second connector.

36. A hand adaptive telephone according to claim 35 wherein the glove member further comprises:

a first keypad adapted to be coupled to the transmitter and carried by the glove member at a location on an outside of the hand of the person when the glove member is worn on the hand of the person to permit the person to input information.

37. A hand adaptive telephone according to claim 36 wherein rows of keys of the first keypad are positioned substantially parallel to a longitudinal axis of the hand of the person.

38. A hand adaptive telephone according to claim 35 wherein the glove member further comprises:

a first display adapted to be coupled to at least one of the transmitter and the receiver and carried by the glove member at a location on an outside of the hand of the person when the glove member is worn on the hand of the person to provide the person with information.

39. A hand adaptive telephone according to claim 38 wherein the first display is positioned substantially parallel to a longitudinal axis of the hand of the person and adjacent to a first side of the first keypad being located opposite to a second side of the first keypad being located adjacent to a thumb of the hand of the user.

40. A hand adaptive telephone according to claim 35 wherein the circuitry receiving mechanism is located on the outside of the hand of the person when the glove member is worn on the hand of the person.

41. A hand adaptive telephone according to claim 35 wherein the circuitry receiving mechanism further comprises:

a card slot adapted to receive a card carrying the transmitter and the receiver and adapted to secure the card to the glove member.

42. A hand adaptive telephone according to claim 35 wherein the circuitry receiving mechanism further comprises:

a pocket adapted to receive a telephone carrying the transmitter and the receiver and adapted to secure the telephone to the glove member.

43. A hand adaptive telephone according to claim 42 wherein the telephone further comprises:

at least one of a keypad and a display, wherein the pocket further comprises a transparent window positioned opposite to the at least one of a keypad and a display when the telephone is received and secured by the pocket.

44. A hand adaptive telephone according to claim 35 wherein the glove member further comprises:

a battery receiving mechanism carried by the glove member and adapted to mechanically receive a battery and to mechanically secure the battery to the glove member.

45. A hand adaptive telephone according to claim 44 wherein the battery receiving mechanism is located on the outside of the hand of the person when the glove member is worn on the hand of the person.

46. A hand adaptive telephone according to claim 35 wherein the glove member further comprises:

a first antenna carried by the glove member and electrically coupled to the transmitter and the receiver.

47. A hand adaptive telephone according to claim 46 wherein the first antenna is carried by the glove member at a location on the outside of the hand of the person when the glove member is worn on the hand of the person, wherein the first antenna is moveable between a stowed position and an unstowed position, and wherein the first antenna is positioned substantially parallel to a longitudinal axis of the hand of the person when the first antenna is moved to at least the unstowed position.

48. A hand adaptive telephone according to claim 35 wherein the glove member further comprises:

a first strap for carrying the first earpiece transducer and adapted to be positioned across the inside a palm or finger of a wrist of the hand of the person;

a second strap for carrying the first microphone transducer and adapted to be positioned across the inside of a wrist of the hand of the person; and a support member mechanically coupled to the first strap and the second strap and adapted to be positioned on the outside of the hand and the wrist of the person when the glove member is worn on the hand of the person, the support member carrying the first connector, the circuitry receiving mechanism and the battery receiving mechanism.

49. A hand adaptive telephone according to claim 35 wherein the glove member further comprises:

a mitten having a first portion adapted to receive four fingers of the hand of the person and having a second portion adapted to receive a thumb of the hand of the person, the mitten adapted to fully cover the hand of the person.

50. A hand adaptive telephone according to claim 35 wherein the glove member further comprises:

a glove having four individual portions adapted to receive each of four fingers of the hand of the person, respectively, and having another portion adapted to receive a thumb of the hand of the person, the glove adapted to fully cover the hand of the person.

51. A hand adaptive telephone comprising:

a glove member adapted to be worn on a hand of a person, the glove member comprising:

an acoustic interface comprising:

a first earpiece transducer adapted to be coupled to a receiver and carried by the glove member at a location on an inside of the hand of the person when the glove member is worn on the hand of the person to permit an ear of the person to listen to acoustic signals generated by the first earpiece transducer when the hand of the person is held against a head of the person; and a first microphone transducer adapted to be coupled to a transmitter and carried by the glove member at a location on the inside of the hand of the person when the glove member is worn on the hand of the person to permit a mouth of the person to speak acoustic signals into the first microphone transducer when the hand of the person is held against the head of the person, the first microphone transducer and the first earpiece transducer being spaced apart by a predetermined distance;

an information interface comprising:

a first keypad adapted to be coupled to the transmitter and carried by the glove member at a location on an outside of the hand of the person when the glove member is worn on the hand of the person to permit the person to input information; and a first display adapted to be coupled to at least one of the transmitter and the receiver and carried by the glove member at a location on the outside of the hand of the person when the glove member is worn on the hand of the person to provide the person with information;

a first connector carried by the glove member and having a first set of contacts electrically coupled to the first earpiece transducer, the first microphone transducer, the first keypad and the first display, the first connector being adapted to electrically couple the first earpiece transducer to the receiver, being adapted to electrically couple the first microphone transducer to the transmitter, being adapted to electrically couple the first keypad to the transmitter, being adapted to electrically couple the first display to at least one of the transmitter and the receiver; and a circuitry receiving mechanism carried by the glove member and adapted to mechanically receive the transmitter and the receiver and to mechanically secure the transmitter and the receiver to the glove member, wherein the transmitter and the receiver are carried by a telephone, the telephone further comprising:

a second earpiece transducer carried by the telephone and electrically coupled to the receiver;

a second microphone transducer carried by the telephone and electrically coupled to the transmitter;

a second keypad carried by the telephone and electrically coupled to the transmitter;

a second display carried by the telephone and electrically coupled to at least one of the transmitter and the receiver;

a second connector carried by the telephone and having a second set of contacts electrically coupled to the second earpiece transducer, the second microphone transducer, the second keypad and the second display, the first connector being adapted to be mechanically coupled to the second connector to permit the first set of contacts to be electrically coupled to the second set of contacts; and a switch carried by the telephone, the switch being adapted to electrically enable the first earpiece transducer, the first microphone transducer, the first keypad and the first display and being adapted to electrically disable the second earpiece transducer, the second microphone transducer, the second keypad and the second display when the first connector is mechanically coupled to the second connector, and the switch being adapted to electrically disable the first earpiece transducer, the first microphone transducer, the first keypad and the first display and being adapted to electrically enable the second earpiece transducer, the second microphone transducer, the second keypad and the second display when the first connector is mechanically decoupled from the second connector.

52. A hand adaptive telephone according to claim 51 wherein rows of keys of the first keypad are positioned substantially parallel to a longitudinal axis of the hand of the person.

53. A hand adaptive telephone according to claim 51 wherein the first display is positioned substantially parallel to a longitudinal axis of the hand of the person and adjacent to a first side of the first keypad being located opposite to a second side of the first keypad being located adjacent to a thumb of the hand of the user.

54. A hand adaptive telephone according to claim 51 wherein the circuitry receiving mechanism is located on the outside of the hand of the person when the glove member is worn on the hand of the person.

55. A hand adaptive telephone according to claim 51 wherein the circuitry receiving mechanism further comprises:

a card slot adapted to receive a card carrying the transmitter and the receiver and adapted to secure the card to the glove member.

56. A hand adaptive telephone according to claim 51 wherein the circuitry receiving mechanism further comprises:

a pocket adapted to receive a telephone carrying the transmitter and the receiver and adapted to secure the telephone to the glove member.

57. A hand adaptive telephone according to claim 56 wherein the telephone further comprises:

at least one of a keypad and a display, wherein the pocket further comprises a transparent window positioned opposite to the at least one of a keypad and a display when the telephone is received and secured by the pocket.

58. A hand adaptive telephone according to claim 51 wherein the glove member further comprises:

a battery receiving mechanism carried by the glove member and adapted to mechanically receive a battery and to mechanically secure the battery to the glove member.

59. A hand adaptive telephone according to claim 58 wherein the battery receiving mechanism is located on the outside of the hand of the person when the glove member is worn on the hand of the person.

60. A hand adaptive telephone according to claim 51 wherein the glove member further comprises:

a first antenna carried by the glove member and electrically coupled to the transmitter and the receiver.

61. A hand adaptive telephone according to claim 60 wherein the first antenna is carried by the glove member at a location on the outside of the hand of the person when the glove member is worn on the hand of the person, wherein the first antenna is moveable between a stowed position and an unstowed position, and wherein the first antenna is positioned substantially parallel to a longitudinal axis of the hand of the person when the first antenna is moved to at least the unstowed position.

62. A hand adaptive telephone according to claim 51 wherein the glove member further comprises:

a first strap for carrying the first earpiece transducer and adapted to be positioned across the inside of a palm or finger of the hand of the person;

a second strap for carrying the first microphone transducer and adapted to be positioned across the inside of a wrist of the hand of the person; and a support member mechanically coupled to the first strap and the second strap and adapted to be positioned on the outside of the hand and the wrist of the person when the glove member is worn on the hand of the person, the support member carrying the first keypad, the first display, the first connector and the circuitry receiving mechanism.

63. A hand adaptive telephone according to claim 51 wherein the glove member farther comprises:

a mitten having a first portion adapted to receive four fingers of the hand of the person and having a second portion adapted to receive a thumb of the hand of the person, the mitten adapted to fully cover the hand of the person.

64. A hand adaptive telephone according to claim 51 wherein the glove member further comprises:

a glove having four individual portions adapted to receive each of four fingers of the hand of the person, respectively, and having another portion adapted to receive a thumb of the hand of the person, the glove adapted to fully cover the hand of the person.

65. A hand adaptive telephone comprising:

a glove member adapted to be worn on a hand of a person, the glove member comprising:

an acoustic interface comprising:

a first earpiece transducer adapted to be coupled to a receiver and carried by a first strap of the glove member at a location on an inside a palm or fingers of the hand of the person when the glove member is worn on the hand of the person to permit an ear of the person to listen to acoustic signals generated by the first earpiece transducer when the hand of the person is held against a head of the person; and a first microphone transducer adapted to be coupled to a transmitter and carried by a second strap of the glove member at a location on the inside of a wrist of the hand of the person when the glove member is worn on the hand of the person to permit a mouth of the person to speak acoustic signals into the first microphone transducer when the hand of the person is held against the head of the person, the first microphone transducer and the first earpiece transducer being spaced apart by a predetermined distance along a common axis;

an information interface comprising:

a first keypad adapted to be coupled to the transmitter and carried by the glove member at a location on an outside of the hand of the person when the glove member is worn on the hand of the person to permit the person to input information; and a first display adapted to be coupled to at least one of the transmitter and the receiver and carried by the glove member at a location on the outside of the hand of the person when the glove member is worn on the hand of the person to provide the person with information;

a radio frequency air interface comprising:

a first antenna carried by the glove member and electrically coupled to the transmitter and the receiver, the first antenna being carried by the glove member at a location on the outside of the hand of the person when the glove member is worn on the hand of the person, the first antenna being moveable between a stowed position and an unstowed position, and the first antenna being positioned substantially parallel to a longitudinal axis of the hand of the person when the first antenna is moved to at least the unstowed position;

a first connector carried by the glove member and having a first set of contacts electrically coupled to the first earpiece transducer, the first microphone transducer, the first keypad and the first display, the first connector being adapted to electrically couple the first earpiece transducer to the receiver, being adapted to electrically couple the first microphone transducer to the transmitter, being adapted to electrically couple the first keypad to the transmitter, being adapted to electrically couple the first display to at least one of the transmitter and the receiver;

a circuitry receiving mechanism carried by the glove member at a location on the outside of the hand of the person when the glove member is worn on the hand of the person and adapted to mechanically receive the transmitter and the receiver and to mechanically secure the transmitter and the receiver to the glove member; and a support member mechanically coupled to the first strap and the second strap and adapted to be positioned on the outside of the hand and the wrist of the person when the glove member is worn on the hand of the person, the support member carrying the first keypad, the first display, the first antenna, the first connector and the circuitry receiving mechanism, wherein the transmitter and the receiver are carried by a telephone, the telephone further comprising:

a second earpiece transducer carried by the telephone and electrically coupled to the receiver;

a second microphone transducer carried by the telephone and electrically coupled to the transmitter;

a second keypad carried by the telephone and electrically coupled to the transmitter;

a second display carried by the telephone and electrically coupled to at least one of the transmitter and the receiver;

a second antenna carried by the telephone and electrically coupled to the transmitter and the receiver;

a second connector carried by the telephone and having a second set of contacts electrically coupled to the second earpiece transducer, the second microphone transducer, the second keypad, the second display, and the second antenna wherein the first connector is adapted to be mechanically coupled to the second connector to permit the first set of contacts to be electrically coupled to the second set of contacts; and a switch carried by the telephone, the switch being adapted to electrically enable the first earpiece transducer, tile first microphone transducer, the first keypad, the first display, and the first antenna and being adapted to electrically disable the second earpiece transducer, the second microphone transducer, the second keypad, the second display, and the second antenna when the first connector is mechanically coupled to the second connector, and the switch being adapted to electrically disable the first earpiece transducer, the first microphone transducer, the first keypad, the first display, and the first antenna and being adapted to electrically enable the second earpiece transducer, the second microphone transducer, the second keypad, the second display, and the second antenna when the first connector is mechanically decoupled from the second connector.

66. A hand adaptive telephone according to claim 65 wherein rows of keys of the first keypad are positioned substantially parallel to a longitudinal axis of the hand of the person.

67. A hand adaptive telephone according to claim 65 wherein the first display is positioned substantially parallel to a longitudinal axis of the hand of the person and adjacent to a first side of the first keypad being located opposite to a second side of the first keypad being located adjacent to a thumb of the hand of the user.

68. A hand adaptive telephone according to claim 65 wherein the circuitry receiving mechanism further comprise:
   a card slot adapted to receive a card carrying the transmitter and the receiver and adapted to secure the card to the glove member.

69. A hand adaptive telephone according to claim 65 wherein the circuitry receiving mechanism further comprises:
   a pocket adapted to receive a telephone carrying the transmitter and the receiver and adapted to secure the telephone to the glove member.

70. A hand adaptive telephone according to claim 69 wherein the telephone further comprises:
   at least one of a keypad and a display,
   wherein the pocket further comprises a transparent window positioned opposite to the at least one of a keypad and a display when the telephone is received and secured by the pocket.

71. A hand adaptive telephone according to claim 65 wherein the glove member further comprises:
   a battery receiving mechanism carried by the glove member and adapted to mechanically receive a battery and to mechanically secure the battery to the glove member, wherein the battery receiving mechanism is located on the outside of the hand of the person when the glove member is worn on the hand of the person.

72. A hand adaptive telephone according to claim 65 wherein the glove member further comprises:
   a mitten having a first portion adapted to receive four fingers of the hand of the person and having a second portion adapted to receive a thumb of the hand of the person, the mitten adapted to fully cover the hand of the person.

73. A hand adaptive telephone according to claim 65 wherein the glove member further comprises:
   a glove having four individual portions adapted to receive each of four fingers of the hand of the person, respectively, and having another portion adapted to receive a thumb of the hand of the person, the glove adapted to fully cover the hand of the person.

74. A hand adaptive telephone comprising:
   a glove member adapted to be worn on a hand of a person, the glove member comprising:
      an acoustic interface comprising:
         a first earpiece transducer adapted to be coupled to a receiver and carried by a first strap of the glove member at a location on an inside a palm or fingers of the hand of the person when the glove member is worn on the hand of the person to permit an ear of the person to listen to acoustic signals generated by the first earpiece transducer when the hand of the person is held against a head of the person; and
         a first microphone transducer adapted to be coupled to a transmitter and carried by a second strap of the glove member at a location on the inside of a wrist of the hand of the person when the glove member is worn on the hand of the person to permit a mouth of the person to speak acoustic signals into the first microphone transducer when the hand of the person is held against the head of the person, the first microphone transducer and the first earpiece transducer being spaced apart by a predetermined distance along a common axis;
      an information interface comprising:
         a first keypad adapted to be coupled to the transmitter and carried by the glove member at a location on an outside of the hand of the person when the glove member is worn on the hand of the person to permit the person to input information, the first keypad having rows of keys being positioned substantially parallel to a longitudinal axis of the hand of the person; and
         a first display adapted to be coupled to at least one of the transmitter and the receiver and carried by the glove member at a location on the outside of the hand of the person when the glove member is worn on the hand of the person to provide the person with information, the first display being positioned substantially parallel to the longitudinal axis of the hand of the person and adjacent to a first side of the first keypad being located opposite to a second side of the first keypad being located adjacent to a thumb of the hand of the user;
      a radio frequency air interface comprising:
         a first antenna carried by the glove member and electrically coupled to the transmitter and the receiver, the first antenna being carried by the glove member at a location on the outside of the hand of the person when the glove member is worn on the hand of the person, the first antenna being moveable between a stowed position and an unstowed position, and the first antenna being positioned substantially parallel to a longitudinal axis of the hand of the person when the first antenna is moved to at least the unstowed position;
      a power supply interface comprising:
         a battery receiving mechanism carried by the glove member and adapted to mechanically receive a battery and to mechanically secure the battery to the glove member, the battery receiving mechanism being located on the outside of the hand of the person when the glove member is worn on the hand of the person;
      a first connector carried by the glove member and having a first set of contacts electrically coupled to the first earpiece transducer, the first microphone transducer, the first keypad, the first display, the battery, the first connector being adapted to electrically couple the first earpiece transducer to the receiver, being adapted to electrically couple the first microphone transducer to the transmitter, being adapted to electrically couple the first keypad to the transmitter, being adapted to electrically couple the first display to at least one of the transmitter and the receiver, and being adapted to electrically couple the battery to the first earpiece transducer, the first microphone transducer, the first keypad, the first display, the transmitter and the receiver;

a circuitry receiving mechanism carried by the glove member at a location on the outside of the hand of the person when the glove member is worn on the hand of the person and adapted to mechanically receive the transmitter and the receiver and to mechanically secure the transmitter and the receiver to the glove member; and a support member mechanically coupled to the first strap and the second strap and adapted to be positioned on the outside of the hand and the wrist of the person when the glove member is worn on the hand of the person, the support member carrying the first keypad, the first display, the first antenna, the first connector, the circuitry receiving mechanism and the battery receiving mechanism, wherein the transmitter and the receiver are carried by a telephone, the telephone further comprising:

a second earpiece transducer carried by the telephone and electrically coupled to the receiver;

a second microphone transducer carried by the telephone and electrically coupled to the transmitter;

a second keypad carried by the telephone and electrically coupled to the transmitter;

a second display carried by the telephone and electrically coupled to at least one of the transmitter and the receiver;

a second antenna carried by the telephone and electrically coupled to the transmitter and the receiver;

a second connector carried by the telephone and having a second set of contacts electrically coupled to the second earpiece transducer, the second microphone transducer, the second keypad, the second display, and the second antenna, the first connector being adapted to be mechanically coupled to the second connector to permit the first set of contacts to be electrically coupled to the second set of contacts; and a switch carried by the telephone, the switch being adapted to electrically enable the first earpiece transducer, the first microphone transducer, the first keypad, the first display, and the first antenna and being adapted to electrically disable the second earpiece transducer, the second microphone transducer, the second keypad, the second display, and the second antenna when the first connector is mechanically coupled to the second connector, and the switch being adapted to electrically disable the first earpiece transducer, the first microphone transducer, the first keypad, the first display, and the first antenna and being adapted to electrically enable the second earpiece transducer, the second microphone transducer, the second keypad, the second display, and the second antenna when the first connector is mechanically decoupled from the second connector.

75. A hand adaptive telephone according to claim 74 wherein the circuitry receiving mechanism further comprise:

a card slot adapted to receive a card carrying the transmitter and the receiver and adapted to secure the card to the glove member.

76. A hand adaptive telephone according to claim 74 wherein the circuitry receiving mechanism further comprises:

a pocket adapted to receive a telephone carrying the transmitter and the receiver and adapted to secure the telephone to the glove member.

77. A hand adaptive telephone according to claim 76 wherein the telephone further comprises:

at least one of a keypad and a display, wherein the pocket further comprises a transparent window positioned opposite to the at least one of a keypad and a display when the telephone is received and secured by the pocket.

78. A hand adaptive telephone according to claim 74 wherein the glove member further comprises:

a mitten having a first portion adapted to receive four fingers of the hand of the person and having a second portion adapted to receive a thumb of the hand of the person, the mitten adapted to fully cover the hand of the person.

79. A hand adaptive telephone according to claim 74 wherein the glove member further comprises:

a glove having four individual portions adapted to receive each of four fingers of the hand of the person, respectively, and having another portion adapted to receive a thumb of the hand of the person, the glove adapted to fully cover the hand of the person.

* * * * *